United States Patent [19]

Ozaki et al.

[11] Patent Number: 5,275,660
[45] Date of Patent: Jan. 4, 1994

[54] LOW MASS, THERMALLY STABLE COATING APPARATUS

[75] Inventors: Kazuo Ozaki; Kazuhiko Nojo; Hideaki Usui, all of Shizuoka, Japan

[73] Assignee: Fuji Photo Film Co., Ltd., Kanagawa, Japan

[21] Appl. No.: 837,618

[22] Filed: Feb. 21, 1992

Related U.S. Application Data

[63] Continuation of Ser. No. 751,617, Aug. 21, 1991, abandoned, which is a continuation of Ser. No. 404,717, Sep. 8, 1989, abandoned.

[30] Foreign Application Priority Data

Sep. 8, 1988 [JP] Japan .................. 63-223383

[51] Int. Cl.$^5$ .................. B05C 3/18
[52] U.S. Cl. .................. 118/411; 118/410; 118/415; 118/419; 118/DIG. 4; 118/315; 118/325
[58] Field of Search .............. 118/225, 255, 313, 315, 118/DIG. 4, 325, 410, 411, 415, 419

[56] References Cited

U.S. PATENT DOCUMENTS

| | | | |
|---|---|---|---|
| 2,761,791 | 9/1956 | Russell . | |
| 4,207,226 | 6/1980 | Storm | 501/88 |
| 4,233,256 | 11/1980 | Ohnsorg | 264/44 |
| 4,252,768 | 2/1981 | Perkins et al. | 501/87 |
| 4,346,849 | 8/1982 | Rood | 239/597 |
| 4,384,015 | 5/1983 | Koepke et al. | 118/420 |
| 4,677,082 | 6/1987 | Alford et al. | 501/134 |
| 4,863,765 | 9/1989 | Ishizuka | 118/410 |
| 5,044,305 | 9/1991 | Shibata et al. | 118/73 |
| 5,072,688 | 12/1991 | Chino et al. | 118/419 |
| 5,072,689 | 12/1991 | Nakagawa et al. | 118/419 |

FOREIGN PATENT DOCUMENTS 63239 1/1988 Japan .

Primary Examiner—W. Gary Jones
Assistant Examiner—Todd J. Burns
Attorney, Agent, or Firm—Sughrue, Mion, Zinn, Macpeak & Seas

[57] ABSTRACT

A coating apparatus for coating a predetermined amount of a coating liquid uniformly onto a continuously running web, said coating apparatus being formed of a ceramic material obtained by sintering at a temperature of not less than 1,000° C., said ceramic material having a coefficient of linear thermal expansion of not more than $11 \times 10^{-6}/°$ C. at temperatures of 25° to 500° C., and said ceramic material having a Vickers hardness of not less than 700 kg/mm$^2$.

17 Claims, 3 Drawing Sheets

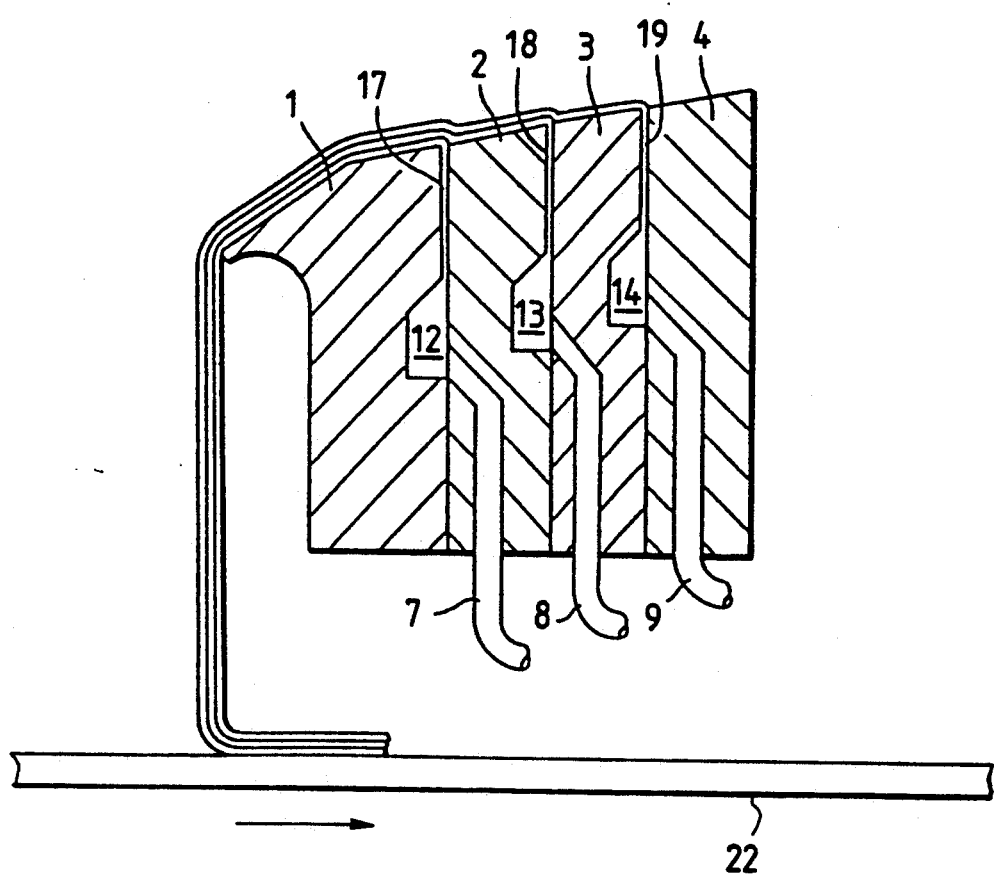

LOW MASS, THERMALLY STABLE COATING APPARATUS

This is a continuation of application ser. No. 07/751,617 filed Aug. 21, 1991, now abandoned, which is a continuation of application Ser. No. 07/404,717 filed Sep. 8, 1989, now abandoned.

FIELD OF THE INVENTION

This invention relates to a coating apparatus for uniformly coating a predetermined amount of a coating liquid onto a continuously-running web. Particularly, this invention relates to a coating apparatus which is designed to improve a surface quality of a coating when a liquid coating composition (hereinafter referred to as "coating liquid") is applied to a continuously-running elongated flexible substrate (hereinafter referred to as "web") in the manufacture of a photosensitive material and a photolithographic material, such as a photographic film and a photographic printing paper, and a recording material such as a pressure-sensitive recording paper and a thermosensitive recording paper. More specifically, this invention relates to a material for forming the coating apparatus.

BACKGROUND OF THE INVENTION

Known examples of methods and apparatuses for coating a photosensitive material onto a substrate include a multi-slide hopper (U.S. Pat. No. 2,761,791) and a multi-layer curtain coating method (Japanese Patent Publication No. 239/88 and Japanese Laid-Open (Kokai) Patent Application No. 74761/79).

Japanese Laid-Open Patent Application No. 27464/87 disclosed a material for a coating apparatus for applying a photosensitive material.

Japanese Laid-Open Patent Application No. 95170/87 discloses a material for a coating apparatus for applying a magnetic material.

As is clear from the above inventions with respect to a photosensitive material, a magnetic recording material and an information recording material, the coating apparatuses are severely required to be manufactured highly precisely and also not to be corroded by the coating liquid, in order to maintain the uniformity of the product and the stabilization of the production.

However, the conventional coating apparatuses suffer from the following problems:

(1) With respect to any type of conventional hopper, the number of blocks is increased with a multi-layer construction, which results in an increased weight of the hopper body. With such a multi-layer construction, a movable bed for setting the hopper accurately in a coating position is increased in weight so as to withstand such a construction, and as a result a drive device is required to produce a very large power.

(2) The hopper is transferred by a carriage, a crane or the like for the purpose of a periodical maintenance (particularly, washing), and therefore such facilities are also required to have an increased strength and to produce a large power in accordance with the overall weight of the hopper equipment. This much increases ancillary facility costs.

(3) When the hopper is subjected to a periodical washing, the blocks are disassembled and re-assembled. Even a single block has a heavy weight, and a crane or the like is used to transfer the hopper. However, in order to maintain a high precision of the hopper and also to prevent damage to the hopper body, the operator is required to have much skill and to take an extreme care in the disassembly and assembly, which results in increased man-hour.

(4) Because of a thermal deformation of the material of the hopper, the conditions under which the hopper is used are limited. More specifically, one of the effects caused by such a thermal deformation is that the distribution of a clearance of the hopper slot portion is increased, so that the distribution of a coating amount in the direction of the width of the substrate is increased. As a result, the performance of the product is varied at the positions of the widthwise slits in the product. Also, particularly in the case of an information recording paper, this may cause the web to travel in a meandering manner immediately after the coating is applied thereto, and the web may have wrinkles. As a result, the web may fail to be uniformly taken up or wound, thus inviting an irregular winding.

To restrain such effects to a minimum and to deal with such problems, a device for controlling the temperature of a coating liquid or a device for controlling a heat retention has conventionally been used. Also, the number of pass rolls and expander rolls is increased so as to prevent a meandering movement of the web and the formation of wrinkles in the web.

Further, in order to ensure the basic performance of the product even at the minimum portion of the coating distribution, the average coating amount is increased.

Another effect caused by the thermal deformation is that the coating stability is adversely affected in the case of a slide hopper and an extrusion hopper.

In the coating operation using a slide hopper or an extrusion hopper, a gap between the distal end of the hopper and a backup roll constitutes an important factor for stabilizing a high-speed coating. However, because of a thermal strain of the hopper, the gap has a large distribution in the direction of the width to adversely affect the stability of the high speed coating. To deal with this, various surface active agents are unduly added to the coating liquid to further improve its coating properties so as to achieve a continuous production even if there is a large distribution in the gap in the direction of the width.

(5) Not only in the coating of a photosensitive material but also in the coating of an information recording material and a magnetic recording material, there are often used a coating liquid and a washing liquid both of which have the pH of not more than 5 or not less than 10. In this case, the problem of corrosion of the material of the hopper is encountered. See, for example, Japanese Laid-Open Patent Application No. 227464/87.

When corrosion develops, stripes are formed on the coating, and the washing properties of the corroded portion is adversely affected, so that a residual coating liquid is mixed with another coating liquid when exchanging the coating liquids, which may adversely affect the performance of another product.

For these reasons, the hopper is periodically disassembled and washed, and it is checked whether or not corrosion develops. If any corrosion is found, a corroded block is re-polished or is replaced by a new one.

(6) Particularly, many of coating liquids of a magnetic recording material are of a highly abrasive nature, and therefore after a certain period of use, the distal end portion of the hopper is worn. In this case, stripes may be formed on the coating, and a stable coating operation may not be carried out.

For these reasons, the distal end portion of the hopper is subjected to a frequent maintenance such as replacement by a new one and the re-polishing.

With the above problems in view, it is an object of this invention to provide a coating apparatus which achieves the following:

(1) to reduce the weights of the hopper and its ancillary facility to thereby reduce the facility cost;

(2) to make the hopper highly precise (and therefore to reduce thermal influences) to stabilize the coating under a wide range of conditions; to obviate the need for an undue addition of additives, such as a surface active agent, to the coating liquid; to apply a uniform coating onto a substrate in the direction of its width under a wide range of conditions (temperature conditions) to provide a product of a more uniform performance; thereby to better stabilize the conveyance of the web after the coating is applied to the web and to improve a bulky winding condition of the product; to stabilize the operation of a slitter when it cuts the product into various sizes to hereby enhance the efficiency of the manufacturing and processing steps to enhance the productivity; and (3) to improve the durability (chemical resistance and wear resistance) to reduce maintenance costs.

SUMMARY OF THE INVENTION

The above object of the invention has been achieved by a coating apparatus for coating a predetermined amount of a coating liquid uniformly onto a continuously running web, said coating apparatus being formed of a ceramic material obtained by sintering at a temperature of not less than 1,000° C., said ceramic material having a coefficient of linear thermal expansion of not more than $11 \times 10^{-6}/°$ C. at temperatures of 25° to 500° C., and said ceramic material having a Vickers hardness of not less than 70 kg/mm$^2$.

BRIEF DESCRIPTION OF THE DRAWINGS

FIG. 6 a vertical cross-sectional view of a slide-type curtain hopper.

Figure 1:
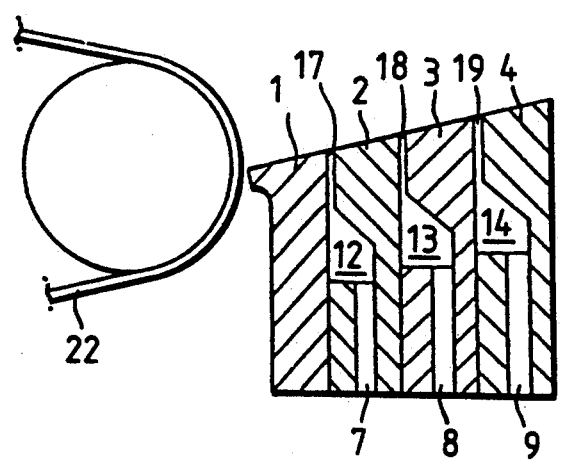
FIG. 1 is a vertical cross-sectional view of a multi-slide hopper.
Figure 2:
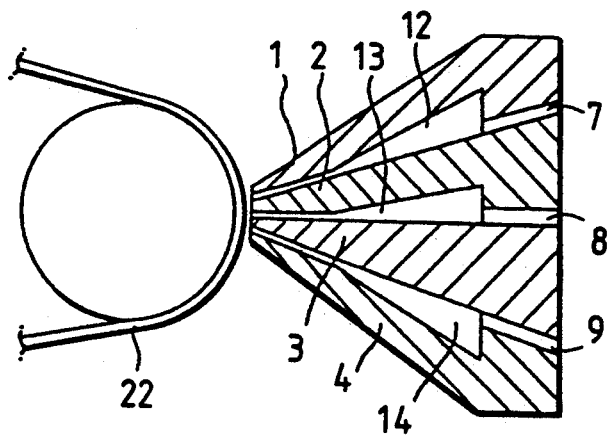
FIG. 2 is a vertical cross-sectional view of a multi-extrusion hopper.

In the FIGS. 1, 2, 3, 4, 5, 6 are blocks, 7, 8, 9, 10, 11 are liquid feed conduits, 12, 13, 14, 15, 16 are cavities, 17, 18, 19, 20, 21 are slots, and 22 is a substrate.

DETAILED DESCRIPTION OF THE INVENTION

The ceramics used in the present invention is a ceramic material which is obtained by sintering, at elevated temperature of not less than 1,000° C., a mixture comprising a single raw material selected from the group consisting of almina ($Al_2O_3$), zirconia (ZrO), silicon carbide (SiC) and silicon nitride ($Si_3N_4$), having a purity of 80% or more, and elements of Si, Al, Ti, C, N, O and so on, as main components.

Specifically, the coating apparatus used in the present invention comprises a hopper such as a single-layer hopper, a multi-slide hopper (FIG. 1), a multi-extrusion hopper (FIG. 2), a curtain hopper (FIG. 3), a multi-extrusion curtain hopper (FIG. 4), a multi-extrusion slide-type curtain hopper (FIG. 5), a slide-type curtain hopper (FIG. 6), a hopper mounting bed required for operating the hopper, and ancillary equipment such as a moving device.

In the present invention, by sintering the ceramics raw material at elevated temperatures of not less than 1,000° C., the density is enhanced, so that the hopper made of such ceramics material has adequate water retention properties. The term "water retention properties" means that the coating liquid (aqueous or solvent solution) or a heat retaining water supplied into the hopper will not penetrate into the material of the hopper even under a pressure of about 5 kg/cm$^2$. Depending on the purity of the material, the sintering temperature varies, and when the purity is not less than 80%, the sintering temperature is not less than 1,000° C.

In the present invention, it has been found that if there is used a ceramics material which has a coefficient of linear thermal expansion of not more than $11 \times 10^{-6}/°$ C. at temperatures of 25° to 500° C., a variation in the distribution of the slot width due to a thermal strain of the hopper material, as well as a variation in the distribution of the coating liquid coated onto the web in its widthwise direction, is kept to within a range of tolerance, and therefore is greatly improved as compared with that of a hopper of a stainless steel material.

In the present invention, since there is used the ceramics material having a Vickers hardness of not less than 700 kg/mm$^2$, a higher wear resistance is achieved as compared with a metal material, and in addition the precision of assembling the blocks into the hopper by tightening bolts is hardly affected by a strain due to such tightening of the bolts.

With respect to the assembling precision, the hopped is constructed of several blocks depending on the number of layers of the hopper. The blocks are mated with one another at their flat surfaces and are connected together by bolts. With respect to the overall construction of the coating apparatus, several ancillary component parts are secured to the hopper body by bolts.

The hopper and its ancillary parts are connected together by the bolts under large torques so that the coating liquid or the heat retaining water will not leak through the joints between them and also so that the assembling precision can be maintained and reproduced.

When the hopper is made of the above ceramics material, the surface condition (roughened surface and undulations) of such a hopper is different from that of a hopper made of stainless steel. Therefore, when the hopper of the ceramics material is to be assembled, the blocks must be joined together by bolts under greater torques than those required for a stainless steel hopper. At this time, unless the Vickers hardness of the material is at least 700 kg/mm$^2$, the material is subjected to deformation and breakage.

Further, it has been found that if the purity of the ceramics material is not less than 80%, its corrosion resistances to respective coating liquids of a photo-sensitive material, an information recording material and a magnetic recording material are greatly improved as compared with those of a stainless steel material.

The hoppers of the coating apparatuses have liquid feed conduits 7, 8, 9, 10, 11, cavities 12, 13, 14, 15, 16 and slots 17, 18, 19, 20, 21, all of which parts are provided between the blocks 1, 2, 3, 4, 5, 6 by cutting an grinding these blocks constituting the hopper.

Therefore, even if a finish precision of the hopper is constant, the precision of the hopper for distributing the coating liquid uniformly on the substrate is influenced by a coefficient of linear thermal expansion of the hopper material in connection with a temperature change and also by the hardness of the material in connection with wear after a prolonged period of use.

In the present invention, there is used the ceramics obtained by sintering at elevated temperatures of not less than 1,000° C., a coefficient of linear thermal expansion of the ceramics being not more than $11 \times 10^{-6}/°C$. (which is about a half of the value of the conventional material) at temperatures of 25° to 500° C., and the ceramics having a Vickers hardness of not less than 700 kg/mm² (which is five times greater than metal) under a load of 500 kg.

The present invention is characterized by the use of the ceramics having such properties.

In the present invention, by using the ceramics of the above nature as the material for the coating apparatus, the following is achieved:

The specific gravity is less than a half of that of the conventional stainless steel, thereby greatly reducing the weight of the apparatus. The coefficient of linear thermal expansion is a half of that of the conventional material, and therefore a thermal deformation is reduced, so that the temperature of the coating liquid can be selected in a wider range. Further, a corrosion resistance to acid and alkali is greatly improved, and therefore a wide variety of coating liquids can be used, and the apparatus can be used for a prolonged period of time. Further, the hardness is very much greater than that of metal and is excellent in wear resistance, and therefor, the apparatus can be used for a prolonged period of time.

EXAMPLE 1

Using materials indicated in Table 1, three-layer hoppers (i.e., multi-slide hopper) each having four blocks, as shown in FIG. 1, were prepared, each block having a width of 1,500 mm and a thickness of about 50 mm, and the widths (clearance) of slots 17, 18 and 19 being adjusted to about 1 mm, 0.7 mm and 0.2 mm, respectively.

TABLE 1

| Material No. | Example | Material | Sintering Temperature (°C.) | Specific Gravity | Linear Thermal Expansion Coefficient ($\times 10^{-6}/°C.$) | Vickers Hardness (kg/mm²) |
|---|---|---|---|---|---|---|
| 1 | Example 1 | Alumina ceramics (85%) | 1,500 | 3.5 | 7 | 1,100 |
| 2 | Comparative Example 1 | Alumina ceramics (80%) | 950 | 3.4 | 6 | 300 |
| 3 | Comparative Example 2 | Stainless steel-based metal | — | 7.9 | 18 | 400 |

Variations in the clearances of the slots after assembly were as shown in Table 2.

TABLE 2

| | (Unit: mm) | | | | | |
|---|---|---|---|---|---|---|
| Material No. | First Layer | | Second Layer | | Third Layer | |
| | C | ΔC | C | ΔC | C | ΔC |
| 1 | 0.998 to 1.001 | 0.003 | 0.710 to 0.712 | 0.002 | 0.220 to 0.221 | 0.001 |
| 2 | 0.990 to 1.002 | 0.012 | 0.701 to 0.715 | 0.014 | 0.201 to 0.220 | 0.019 |
| 3 | 1.005 to 1.010 | 0.005 | 0.702 to 0.710 | 0.008 | 0.211 to 0.216 | 0.005 |

With respect to Material No. 2, the Vickers hardness was so small that a high precision could not be maintained during the processing and assembly.

Using the above hoppers, coating operations were carried out under three temperature conditions (i.e., the temperatures of the coating liquid: 20° C., 40° C. and 60° C.), the coating rates of the slots being 10 l/min. (first layer), 5 l/min. (second layer), and 3 l/min. (third layer), respectively.

TABLE 3

| | (Unit: mm) | | | | | | Widthwise Distribution of Coating |
|---|---|---|---|---|---|---|---|
| Material No. | First Layer | | Second Layer | | Third Layer | | |
| | C | ΔC | C | ΔC | C | ΔC | |
| 1 | 0.999 to 1.001 | 0.002 | 0.712 to 0.713 | 0.001 | 0.220 to 0.222 | 0.002 | 3% |
| 2 | 0.990 to 1.002 | 0.012 | 0.701 to 0.715 | 0.014 | 0.201 to 0.221 | 0.020 | 15% |
| 3 | 1.002 to 1.012 | 0.010 | 0.705 to 0.711 | 0.006 | 0.210 to 0.220 | 0.010 | 8% |

Material No. 3 (stainless steel) suffers from the effects of high thermal expansion, but the variations of Material Nos. 1 and 2 are small as compared with Table 2. With respect to the ceramics materials, the distribution of the coating in the direction of the width is far better in the ceramics of the present invention. When the distribution of a clearance between each hopper body and a backing roller was measured in he widthwise direction during the coating operation, very goods results were obtained with respect to Material No. 1, as indicated in Table 4 below.

TABLE 4

| Material No. | Clearance Range | Variations |
|---|---|---|
| 1 | 1.000 to 1.010 | 0.01 |
| 2 | 1.000 to 1.150 | 0.15 |
| 3 | 1.000 to 1.070 | 0.07 |

The coating speed was gradually increased and finally to an upper limit, so that the coating liquid could be not uniformly coated onto the substrate. Such upper limits are shown in Table 5.

TABLE 5

| Material No. | Upper Speed Limit |
|---|---|
| 1 | −200 m/min. |
| 2 | −120 m/min. |
| 3 | −150 m/min. |

As described above, by selecting the specific ceramics of he present invention for the material of the coating apparatus in view of not only the chemical resistance but also the linear thermal expansion coefficient and the hardness, the ceramics impart a revolutionary change to the coating apparatus, and besides achieve excellent advantages for the photographic coating apparatus.

EXAMPLE 2

Figure 3:
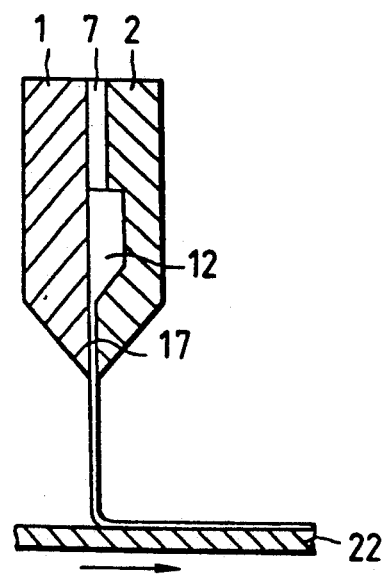
FIG. 3 is a vertical cross-sectional view of curtain hopper.
Figure 4:
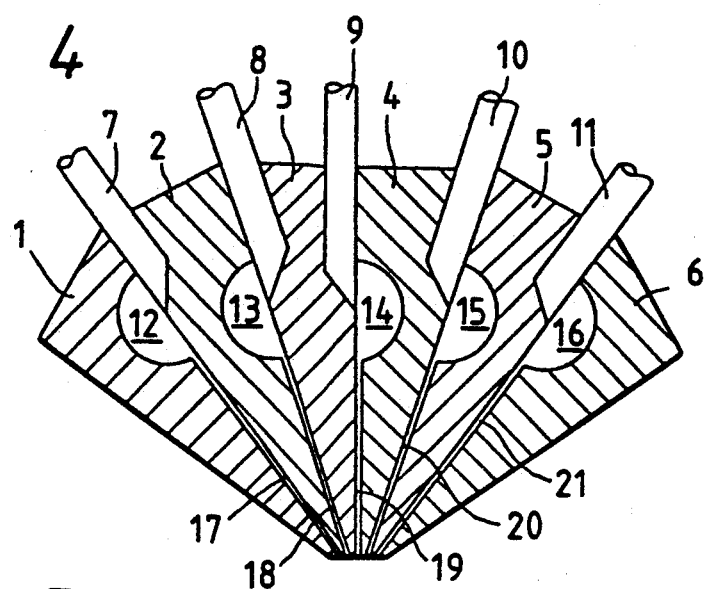
FIG. 4 is a vertical cross-sectional view of a multi-extrusion curtain hopper.
Figure 5:
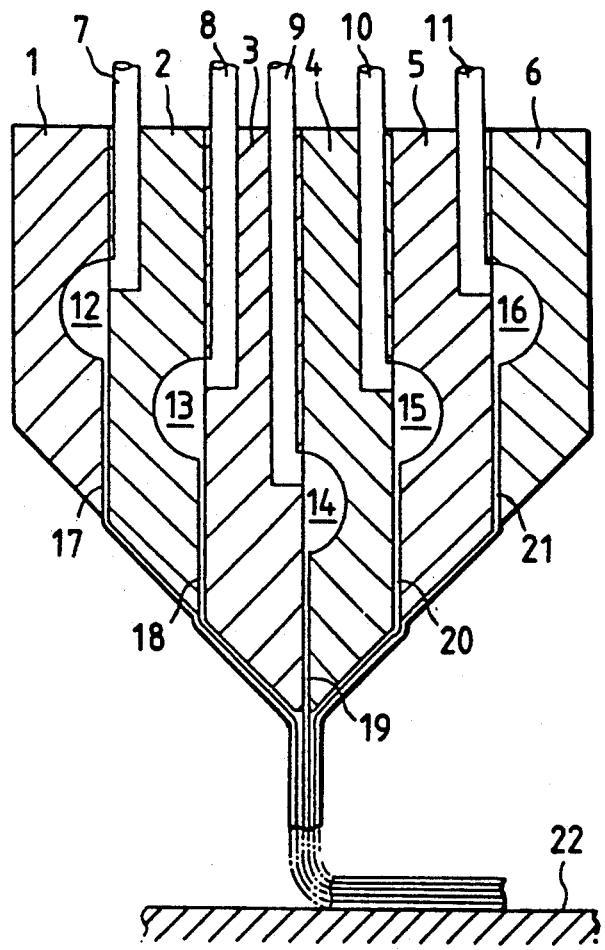
FIG. 5 is a vertical cross-sectional view of a multi-extrusion slide type curtain hopper.

Using materials indicated in Table 6 under sintering conditions indicated in Table 6, extrusion hoppers each having a single block, as shown in FIG. 3, were prepared, each block having a width of 1,000 mm and a thickness of about 50 mm, and the width of a slot being adjusted to 1 mm. Variations in the slot clearance before use and during the coating operation as well as the distribution of the coating in the direction of the width of a web were as indicated in Table 7.

TABLE 6

| Material No. | Example | Material | Sintering Temperature (°C.) | Specific Gravity | Linear Thermal Expansion Coefficient ($\times 10^{-6}$/°C.) | Vickers Hardness (kg/mm$^2$) |
|---|---|---|---|---|---|---|
| 4 | Example 2 | Alumina ceramics (80%) | 1,400 | 3.4 | 10 | 950 |
| 5 | Comparative Example 3 | Stainless based-metal | — | 7.9 | 18 | 400 |

TABLE 7

| Material No. | Before Use (mm) | | During Coating (mm) | | Distribution of Coating |
|---|---|---|---|---|---|
| | C | ΔC | C | ΔC | |
| 4 | 0.998 to 0.999 | 0.001 | 0.999 to 0.999 | 0 | 1 to 2% |
| 5 | 1.001 to 1.007 | 0.006 | 0.995 to 1.011 | 0.016 | 5 to 6% |

Coating Conditions

Coating liquid: Coating liquid for pressure-sensitive paper; 15° C., 10 l/min.

Heat retaining water: Water; 25° C., 10 l/min.

Thus, it has been found that as is the case with Example 1, the hopper of the present invention could coat the coating liquid much more uniformly than the hopper of the stainless steel.

As described above, the present invention achieves the following advantages:

(1) The weight of the coating facilities is reduced, thereby enabling a large cost reduction. Also, the weight reduction enables a reduction of power capacity and a compact overall construction of the facilities.

(2) Cost Reduction of Product

Even if the number and amount of additives (chemicals) added to the coating liquid are reduced, a uniform stable coating can be carried out, and such a uniform coating stabilizes the operation from the production (coating) to the processing.

(3) Simplification of Maintenance of Facilities

The material of the present invention has a greater chemical resistance than metal, and therefore the durability is enhanced to simplify the maintenance, and the handling can be done more easily because of the weight reduction.

(4) Improved Quality of Product and Stabilization of Production

The amount of the coating in the direction of the width of the substrate is made uniform because of a highly precise construction of the hopper, and a bridge portion of the coating liquid extending between the substrate and the hopper of the slide type or the extrusion type is stabilized. Therefore, the quality of the product and the stabilization of the production are enhanced.

What is claimed is:

1. A coating apparatus selected from the group consisting of a single-layer hopper, a multi-slide hopper, a multi-extrusion hopper, a curtain hopper, a multi-extrusion curtain hopper, a multi-extrusion slide-type curtain hopper and a slide-type curtain hopper for coating a predetermined amount of a coating liquid uniformly onto a continuously running web, said coating apparatus being formed of a ceramic material obtained by sintering a mixture at a temperature of not less than 1,000° C., said ceramic material having a coefficient of linear thermal expansion of not more than $11 \times 10^{-6}$/° C. at temperatures of 25° to 500° C., and said ceramic material having a vickers hardness of not less than 700 kg/mm$^2$.

2. A coating apparatus as in claim 1, herein said ceramic material is obtained by sintering said mixture comprising a raw material selected for the group consisting of Al$_2$O$_3$, ZrO, SiC and Si$_3$N$_4$.

3. A coating apparatus as in claim 2, wherein said raw material of the ceramic material has a purity of not less than 80%.

4. In a coating apparatus for uniformly coating a predetermined amount of at least one coating liquid onto a continuously moving web, said coating apparatus including a hopper formed form a plurality of opposing pieces and means for supporting and positioning the hopper so as to maintain the hopper in an optimal coating position, the improvement comprising each of said pieces being formed from a ceramic material obtained by sintering a mixture at a temperature of greater than 1000° C., said ceramic material having a coefficient of linear expansion of not more than $11 \times 10^{-6}/°$ C. at a temperature in the range of about 25° to 500° C., and said ceramic material having a Vickers hardness of not less than 700 kg/mm$^2$.

5. The coating apparatus of claim 4, wherein said hopper is a single layer hopper.

6. The coating apparatus of claim 4, wherein said hopper is a multi-slide hopper.

7. The coating apparatus of claim 4, wherein said hopper is a multi-extrusion hopper.

8. The coating apparatus of claim 4, wherein said hopper is a curtain hopper.

9. The coating apparatus of claim 4, wherein said hopper is a multi-extrusion curtain hopper.

10. The coating apparatus of claim 4, wherein said hopper is a multi-extrusion slide-type curtain hopper.

11. The coating apparatus of claim 4, wherein said hopper is a slide-type curtain hopper.

12. The coating apparatus of claim 4, wherein said ceramic material is obtained by sintering said mixture comprising a raw material having a plurality of not less than 80%.

13. The coating apparatus of claim 12, wherein said raw material is $Al_2O_3$.

14. The coating apparatus of claim 12, wherein said raw material is $ZrO$.

15. The coating apparatus of claim 12, wherein said raw material is $SiC$.

16. The coating apparatus of claim 12, wherein said raw material is $Si_3N_4$.

17. The coating apparatus of claim 12, wherein said raw material is mixed with elements selected from the group consisting of Si, Al, Ti, C, N and O.

* * * * *